United States Patent [19]

Chavannes

[11] Patent Number: 5,726,853
[45] Date of Patent: Mar. 10, 1998

[54] HIGH VOLTAGE PROTECTION CIRCUIT FOR TELEPHONE TEST SET

[75] Inventor: Theodore E. Chavannes, Thousand Oaks, Calif.

[73] Assignee: Harris Corporation, Melbourne, Fla.

[21] Appl. No.: 618,323

[22] Filed: Mar. 19, 1996

[51] Int. Cl.$^6$ .................................................. H02H 1/00
[52] U.S. Cl. ........................... 361/119; 361/115; 361/93
[58] Field of Search ................................ 361/119, 115, 361/93, 91, 56; 379/1; 323/908

[56] References Cited

U.S. PATENT DOCUMENTS

| | | | |
|---|---|---|---|
| 4,682,345 | 7/1987 | Elsenpeter | 379/22 |
| 4,791,544 | 12/1988 | Gautherin | 323/908 |
| 5,163,079 | 11/1992 | Crowdis | 379/27 |

Primary Examiner—Jeffrey A. Gaffin
Assistant Examiner—Stephen W. Jackson
Attorney, Agent, or Firm—Charles E. Wands

[57] ABSTRACT

An overvoltage protection circuit prevents damage to the electronic circuitry of a craftsperson's test set, in the event of accidental application of a potentially destructive high voltage to one or more leads of the test set. The test set's dial pulsing circuitry employs a power-dissipating N-channel MOSFET as the operative switching component. The protection circuit is coupled to the MOSFET and includes a power-dissipation controlled current-limiting and timing circuit, either as an electronic or thermostat-based implementation. During the dialing mode, the current path through the power MOSFET is alternately turned on and off by the test set's internal dial pulse control circuitry. At all times, the protection circuit provides instantaneous overvoltage protection and constant current limiting. If the excess voltage condition last long enough, the timing circuit regulates average current flow by alternately turning the MOSFET on and off, in a manner that limits average power dissipation in the MOSFET to less than a destructive value. Modulation of the current flow path through the MOSFET is based upon the product of its (source-drain) loop current and its drain-source voltage $V_{DS}$, which depends upon the magnitude of the line voltage.

34 Claims, 2 Drawing Sheets

HIGH VOLTAGE PROTECTION CIRCUIT FOR TELEPHONE TEST SET

FIELD OF THE INVENTION

The present invention relates in general to telecommunications systems, and is particularly directed to high voltage protection circuit that is integrated with the dialing pulse circuitry of a telephone craftsperson's test set, and is operative to protect the electronic circuitry components of the test set from damage in the event of the accidental connection of test set leads to a high voltage line, or if a high voltage is present on the telephone line being tested.

BACKGROUND OF THE INVENTION

The environment in which a telephone craftsperson carries out various line evaluation and repair functions, such as a central office, subscriber premises, terminal block closet, etc., typically has various electronic signalling and power conductor lines installed in that facility. As a consequence, even with the exercise of due care, there is the possibility of one or more leads of the craftsperson's test set accidentally coming in contact with a high voltage line (e.g., 105 VDC or 250 VAC), or the possibility of a high voltage line inadvertently becoming shorted to a telephone line to which a test set lead has been connected. Regardless of the reason for the accidental connection, unless the test set is protected against propagation of the high voltage to its internal electronics, the test set will be effectively destroyed.

Although conventional protection circuits, such as series-connected thermistor and line-shunting metal oxide varistor (MOVs) circuits have been used for surge protection in power supply environments, as well as test sets when protecting against voltages up to 120 VAC, when protection component values are selected to protect against higher voltages, such as 250 VAC, they do not allow the test set to satisfy loop test requirements due to excessive series loop resistance.

SUMMARY OF THE INVENTION

In accordance with the present invention, the above described problem of the accidental application of a potentially destructive high voltage to one or more leads of a craftsperson's test set is successfully addressed by configuring the dial pulsing circuit of the test set to include an N-channel power-dissipating MOSFET as the operative switching component, and integrating with the N-channel power MOSFET a power-dissipation controlled current-limiting and timing circuit. The timing circuit may be configured either as an electronic or thermostat-based implementation.

During out-pulse dialing mode, the current path through the N-channel power MOSFET is controllably modulated (alternately turned on and off) by means of the test set's internal dial pulse control circuitry, in a conventional manner, so as to modulate the state of the tip and ring telephone loop pair for out-pulse dial signaling.

At all times, the protection circuit provides instantaneous overvoltage protection and constant current limiting. The value of instantaneous current limiting must be high enough to provide correct loop parameters for normal test purposes. However, if the excess voltage condition lasts long enough, the high power dissipation in the N-channel power MOSFET will eventually cause the MOSFET temperature to exceed safe limits and the MOSFET will fail. In this mode, the timing circuit is operative to regulate average current flow through the N-channel power MOSFET by alternately turning the MOSFET on and off, in a manner similar to dial pulse signalling, but in a manner that limits power dissipation in the MOSFET to less than a destructive value. In this overvoltage protection mode, modulation of the average current flow through the MOSFET is dependent upon the product of the loop current $I_{DS}$ flowing through the power MOSFET and the drain-to-source voltage $V_{DS}$ across the MOSFET. The gate-source voltage $V_{GS}$ is modulated by both loop current and the timing circuit to provide the required MOSFET protection.

The current limiting circuit portion of the overvoltage protection circuit is operative to limit the loop current $I_{DS}$ flowing through the MOSFET to a prescribed maximum value $I_{DSMAX}$. With the loop current through the MOSFET so limited, the conduction time of the MOSFET is defined such that the average power dissipated by the MOSFET does not exceed predefined protection limits. For a higher line voltage (such as 250 VAC or 105 VDC) which translates into a high value of $V_{DS}$, the MOSFET conduction time is relatively short; for a lower line voltage, a longer MOSFET conduction time is permitted.

In a first embodiment of the invention, at the termination of the MOSFET conduction time, a one-shot portion of the timing circuit keeps the MOSFET turned off for a prescribed temperature recovery interval that will allow the MOSFET temperature to recover, so that the average power dissipated through the MOSFET during a complete modulation cycle will not destroy the MOSFET. In second and third embodiments, a thermocouple switch coupled to monitor the temperature of the MOSFET is alternately opened and closed, so as to regulate the duty cycle of the loop current that is allowed to flow.

DETAILED DESCRIPTION

To facilitate an understanding of the present invention and to avoid unnecessary cluttering of the drawings, only those portions of the test set that pertain to the present invention are illustrated in the Figures and will be described. Since the test set itself is otherwise of conventional construction, the remaining circuit components, such as dialing chips, speech chips, etc., thereof have not been shown in detail nor are they described here.

Figure 1:
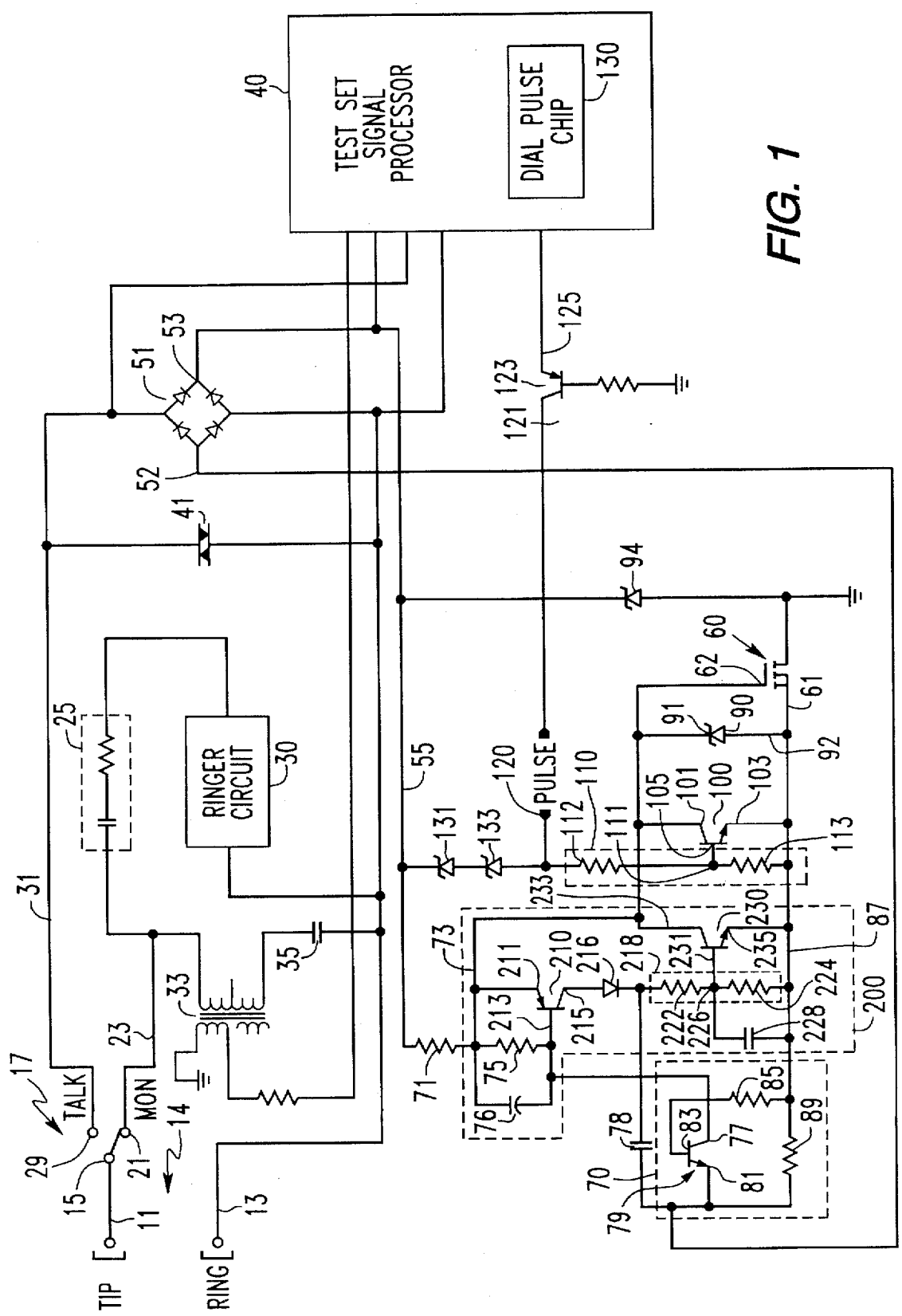
FIG. 1 is a schematic diagram of a first embodiment of a high voltage protection circuit in accordance with the present invention, and the manner in which it is incorporated into a telephone craftsperson's test set for protecting the electronic circuit components of the test set from accidental connection of its test leads to a high voltage line.

FIG. 1 schematically illustrates the configuration of a first embodiment of the overvoltage protection circuit of the present invention, and the manner in which it is coupled with the dial-pulse circuitry of a telephone craftsperson's test set. As described briefly above, the protection circuit includes current limiting and timing circuit components, which are operative to protect both the dial pulsing components and the remainder of the electronics of the test set from destructive current flow, in the event of accidental connection of test set (tip and ring) leads to a high voltage line.

In order that it may be coupled to a telephone line for normal usage, the test set includes a pair of terminal leads 11 and 13, respectively associated with and connectable to the tip (T) and ring (R) leads of a standard telephone loop 14. The tip-associated terminal lead 11 is shown as being coupled to the common terminal 15 of a talk/monitor switch 17. The monitor position terminal 21 of talk/monitor switch 17 is coupled via a line 23 to the test set signal processing circuitry 40 via the secondary winding of transformer 33, returning to the ring terminal lead 13 via capacitor 35. Line 23 is also shown as being coupled to a standard ringer circuit 30, through a resistor-capacitor network 25, also returning to the ring terminal lead 13. The monitor circuit components do not require separate protection ofrm high voltages as the series capacitors utilized inherently provide the major share of the protection.

The talk position terminal 29 of switch 17 is coupled to a tip line 31. Each of the test set's ring line 13 and tip line 31 is coupled to downstream signal processing circuitry 40 via bridge rectifier 51, including the above referenced speech/signal processing chip components.

A metal oxide varistor (MOV) 41 is connected across the tip line 31 and the ring terminal lead 13 and is operative to protect the circuitry of the test set against extremely high voltage spikes, such as lightning strike-based surges in the line, with the MOV 41 limiting the surge to a voltage peak on the order of 600 volts. A full wave rectified version of the voltage applied to the tip and ring leads is derived at terminal 53. Like the tip and ring leads 31 and 13, the rectified line voltage terminal 53 is coupled to the signal processing circuitry 40.

As described previously, the overvoltage protection circuit of the present invention is integrated into the test set electronics as part of its dial pulse signalling circuitry. The principal pulsing component of the outpulsing circuitry is a controlled switching element, shown as an N-channel power-dissipating MOSFET 60, having its source-drain path coupled between a current limiting circuit 70, the signal processing circuitry 40 and bridge rectifier 51. As a non-limiting example, N-channel MOSFET may have a rating of 600 volts, so that it will be able to accommodate a 600 volt line surge peak, as limited by MOV 41 in the event of an anomaly such as a lightning strike-based surge, as described above.

Current limiting circuit 70 is coupled to a relatively high valued resistor 71 (e.g., having a value on the order of 700KΩ), which is coupled between a line 55, to which the rectified voltage terminal 53 of bridge rectifier 51 is connected, and a line 73. Line 73 is coupled through a capacitor discharge or bleed resistor 75 to the collector 77 of a current limiting NPN transistor 79, the emitter 81 of which is coupled to voltage terminal 52 of bridge rectifier 51. Current limiting transistor 79 has its base 83 coupled through a base current-limiting resistor 85 to a line 87, which is coupled to the source 61 of power MOSFET 60. A further relatively low valued, line current sense resistor 89 is coupled between line 87 and the emitter 81 of current limiting NPN transistor 79.

When operational, current limiting 70 circuit is operative to limit the current flow over line 87 through the turn-on source-drain path of power MOSFET 60 to a prescribed maximum current value (e.g., on the order of 150 mA). As will be described, the timing circuit portion of the overvoltage protection circuit is operative to limit the length of time that loop current through the MOSFET is allowed to flow, in dependence upon the magnitude of the line voltage, so that the power dissipated in MOSFET 60 does not exceed predefined limits.

MOSFET 60 has is gate electrode 62 coupled to line 73 and to the cathode 91 of a Zener diode 90, the anode 92 of which is coupled to line 87 and the source electrode 61 of the MOSFET 60. When Zener diode 90 conducts, it limits the source-to-gate voltage of MOSFET 60 for protection purposes. A further Zener diode 94 (which may be rated at a value on the order of 12 volts) is coupled between line 55 and ground, and is operative to clamp the voltage on line 55 to a safe level during intervals that the signal processing circuitry 40 is not active.

The outpulsing circuitry of the test set further includes a MOSFET outpulsing modulation-control NPN transistor 100 having its collector 101 coupled to line 73 and its emitter 103 coupled to line 87. The base 105 of transistor 100 is connected to a node 111 of a voltage divider resistor network 110, comprised of resistors 112 and 113, which are series-connected in circuit between a pulse control terminal 120 and line 87. Pulse control terminal 120 is coupled to the collector 121 of a common base-connected buffer transistor 123, the emitter 125 of which is coupled to receive a dial pulse modulation signal from a dial pulse chip 130 within the test set's signal processing circuitry 40.

Pulse control terminal 120 is further coupled through a pair of series connected Zener diodes 131 and 133 to line 55. Zener diodes 131 and 133 (each of which may be rated at a value on the order of 70 V) are operative to protect buffer transistor 123 (which may have a performance rating on the order of 300 V, for example) from an excessive line overvoltage, that may reach a peak value of 600 V as limited by the surge protection MOV 41, as described above. In addition, whenever Zener diodes 131 and 133 are rendered conductive, the resulting voltage applied to node 111 of resistor voltage divider network 110 provides a hard forward-bias to the base-emitter junction of transistor 100, so that transistor 100 is driven to saturation. This causes its collector-emitter current flow path to effectively short MOSFET gate 62 to the source 61, thereby holding MOSFET 60 in the off state.

During normal outpulsing mode, a modulating pulse signal applied by the dial pulse chip 130 to pulse control terminal 120, and thereby to voltage divider network 110, alternately couples a forward and reverse biasing voltage level to node 111, so that transistor 100 is alternately turned on and off. Whenever the state of the control pulse signal applied to pulse control terminal 120 is such that outpulsing modulation-control NPN transistor 100 is turned on, thereby effectively shorting the gate 62 of MOSFET 60 to its source 61, MOSFET 60 is turned off, so that there is no current flow path therethrough to draw current (through current limiting circuit 70) from the line. Conversely, whenever the state of the control pulse signal applied to pulse control terminal 120 is such that outpulsing modulation-control NPN transistor 100 is turned off, the gate 62 of MOSFET 60 is coupled to receive a positive voltage coupled through resistor 71 from line 55, so that the source-drain current flow path through MOSFET is conductive and draws current through current limiting circuit 70 from the line.

At all times, the power MOSFET 60 is in the overvoltage protection and excess power dissipation prevention mode. In this mode, the current limiting circuit 70, together with an associated combined integrator and one-shot timing circuit 200 are operative to regulate both peak and average loop current flow through the N-channel power MOSFET 60, by alternately turning power MOSFET 60 on and off, in a manner similar to dial pulse signalling, described above, except that the current limiting circuit 70 is active, which controls the gate-to-source voltage of power MOSFET 60 in a linear manner.

However in the overvoltage protection mode, the on time of the modulation cycle of loop current flow through the source-drain path through N-channel power MOSFET 60 is dependent upon the product of the current flowing through the power MOSFET 60 (as limited by current limiting circuit 70) and the drain-to-source voltage $V_{DS}$, which is derived from the line voltage through resistor 71 to line 73, to which the gate electrode 62 of N-channel power MOSFET 60 is connected.

For this purpose, timing circuit 200 comprises a PNP transistor 210 having its emitter 211 coupled to line 73, its base 213 coupled to capacitor bleed resistor 75 and one end of a power dissipation duration control capacitor 76, the other end of which is coupled to emitter 211. The collector 215 of transistor 210 is coupled through a diode 216 to one end of a 'one-shot' recovery duration capacitor 78 and to a voltage divider network 218. A second end of 'one-shot' recovery duration capacitor 78 is coupled to the emitter 81 of current limiting NPN transistor 79. Voltage divider 218 is comprised of series-connected resistors 222 and 224, the junction node 226 of which is coupled to the base 231 of an NPN transistor 230 and through an RF susceptibility capacitor 228 to line 87. NPN transistor 230 has its collector 233 coupled to line 73 and its emitter 235 coupled to line 87, along with voltage divider 218.

In operation, with transistors 210 and 230 being turned off, and N-channel power MOSFET 60 turned on (with its source-drain current being limited by the operation of current limiting circuit 70, as described above), power dissipation duration control capacitor 76 is charged through resistor 71. Whenever transistor 210 is turned off, 'one-shot' recovery duration capacitor 78 discharges through the resistors 222 and 224 of voltage divider network 218 and line current sense resistor 89. Similarly, when N-channel power MOSFET 60 is turned off, there is no current flow therethrough for current limiting circuit 70 to limit. During this time, power dissipation duration control capacitor 76 discharges through bleed resistor 75.

Because resistor 71 is a relatively high valued resistor, the time required to charge power dissipation duration control capacitor 76 to a value that forward biases PNP transistor 210 will depend upon the magnitude of the line voltage, as coupled through resistor 71 from line 55. Thus, the higher the line voltage, the more quickly power dissipation duration control capacitor 76 will charge, whereas for a relatively low line voltage, power dissipation duration control capacitor 76 will charge more slowly. For a substantial overvoltage condition (on the order of 250 VAC, for example), power dissipation duration control capacitor 76 will rapidly charge to a value that turns on transistor 210.

When transistor 210 turns on, 'one-shot' recovery duration capacitor 78 begins to charge through transistor 210 and diode 216. It should be noted that the charging current of capacitor 78 remains virtually unchanged as it is also determined by the line voltage and resistor 71. Moreover, the 'one-shot' recovery duration capacitor 78 is precharged with an opposite polarity to terminate the conduction period, due to the effect of the voltage drop across the line current sense resistor 89 and the fact that it is coupled to one end of 'one-shot' recovery duration capacitor 78, thereby significantly increasing the time required to terminate the conduction period.

As 'one-shot' recovery duration capacitor 78 is charged, the voltage at node 226 of voltage divider network 218 eventually reaches the base-emitter threshold voltage of transistor 230, so that transistor 230 begins to turn on. This causes its collector-emitter current flow path to begin to provide a low resistance path between MOSFET gate 62 and its source 61, thereby reducing the gate drive to MOSFET 60 and rendering MOSFET 60 non-conductive, in a manner somewhat similar to that described above for the operation of outpulse dialing control transistor 100.

As transistor 230 begins to turn on, it reduces the loop current established by the current limiting circuit 70, increasing the voltage on the negative of 'one-shot' recovery duration capacitor 78, which couples through to the positive end of capacitor 78 and increases the base drive to transistor 230, until transistor 230 becomes saturated, and shorts the MOSFET gate 62 to its source 61, thereby turning MOSFET 60 off, and interrupting loop current flow.

With loop current being interrupted as a result of MOSFET 60 being turned off, a 'one-shot' circuit operation is initiated by the timing circuit 200, as 'one-shot' recovery duration capacitor 78 begins to discharge through voltage divider network 218 and line current sense resistor 89. The discharge time constant established by 'one-shot' recovery duration capacitor 78 and its associated discharge resistor components provides a prescribed 'one-shot' type of power dissipation recovery interval (e.g., on the order of 900 ms, for example), during which MOSFET 60 is maintained turned off, so as to allow the MOSFET 60 temperature rise to recover from the power dissipated therein during its previous current flow interval, so that the average power dissipated through MOSFET 60 during a complete modulation cycle will be less than a prescribed power dissipation limit that avoids damage to the MOSFET.

As 'one-shot' recovery duration capacitor 78 discharges through resistor network 218 and line current sense resistor 89, the voltage at node 226 of voltage divider network 218 eventually drops below the base-emitter threshold voltage of transistor 230, causing transistor 230 to turn off. When transistor 230 turns off, the source 61 and gate 62 of MOSFET 60 are no longer effectively shorted together. If an overvoltage is still present on the telephone line, the positive voltage on line 73 (and applied to MOSFET gate 62) will again turn on MOSFET 60, with the loop current through its source-drain path again being limited by the operation of the current limiting circuit 70, as described above.

It will be appreciated from foregoing description that timing circuit 200 is operative to make the on-time or conduction time of the current flow path through MOSFET 60 dependent upon the power dissipated in the MOSFET. The dissipated power in MOSFET 60 is the product of its source-drain current $I_{DS}$ (as limited by current limiting circuit 70) and its drain-to-source voltage $V_{DS}$. Since the drain-to-source voltage $V_{DS}$ is a function of the magnitude of the line voltage, the length of time that loop current is allowed to flow is necessarily dependent upon the magnitude of the line voltage. For a large overvoltage condition, such as 250 VAC, the time required to charge power dissipation duration control capacitors 76 and 78 will be relatively short, so that the on or loop current flow time through MOSFET 60 will correspondingly be very brief, and thereby limit the average power dissipated by MOSFET 60, hence limit the temperature rise of MOSFET 60. On the other hand, if the line voltage is relatively low, then a longer period of time will be required to charge power dissipation duration control capacitors 76 and 78, thereby allowing MOSFET 60 to dissipate approximately the same average power over a relatively increased period of time (higher duty cycle) without damage.

Figure 2:
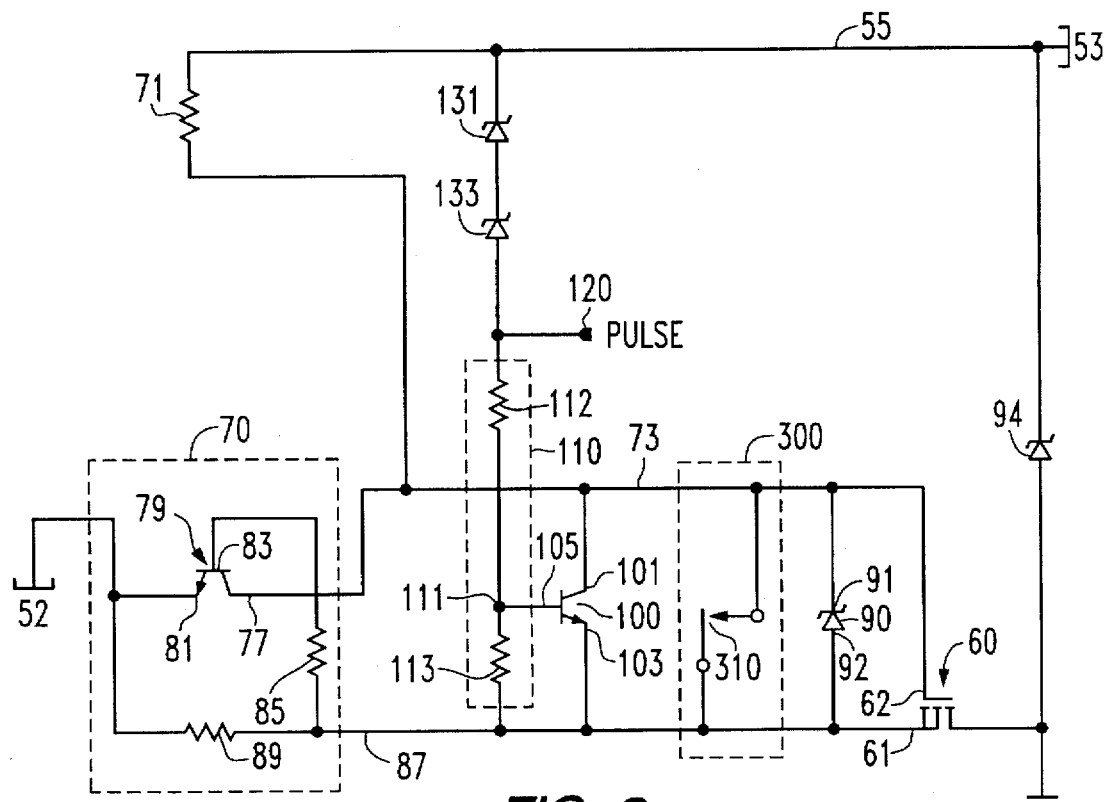
FIG. 2 is a schematic diagram of a second embodiment of a high voltage protection circuit in accordance with the present invention.

FIG. 2 schematically illustrates the configuration of a second embodiment of a high voltage protection circuit in accordance with the present invention, in which the combined integrator and one-shot timing circuit 200 of the embodiment of FIG. 1 are replaced by a normally open thermostat device 300, shown as a thermostat 310, which is coupled across the gate-source electrodes of MOSFET 60. Thermostat 300 may be physically bonded directly to the body of MOSFET 60 by means of a thermally conductive adhesive. Also, in this second embodiment, with the timing circuit removed, line 73, to which line coupling resistor 71 is connected, is coupled directly to the collector 77 of current limiting NPN transistor 79 of the current limiting circuit 70.

In operation, as power is dissipated during the on or conductive state of MOSFET 60, the increase in temperature of the MOSFET is sensed by thermostat 300, eventually reaching a prescribed trip point (e.g., 90° C.), thereby shorting the MOSFET gate 62 to its source 61, turning MOSFET 60 off, and interrupting loop current flow. As MOSFET 60 cools down sufficiently so that its temperature falls below the trip point of the thermostat, the thermostat 310 opens, again allowing loop current to flow through the MOSFET, and restarting the power dissipation cycle.

Figure 3:
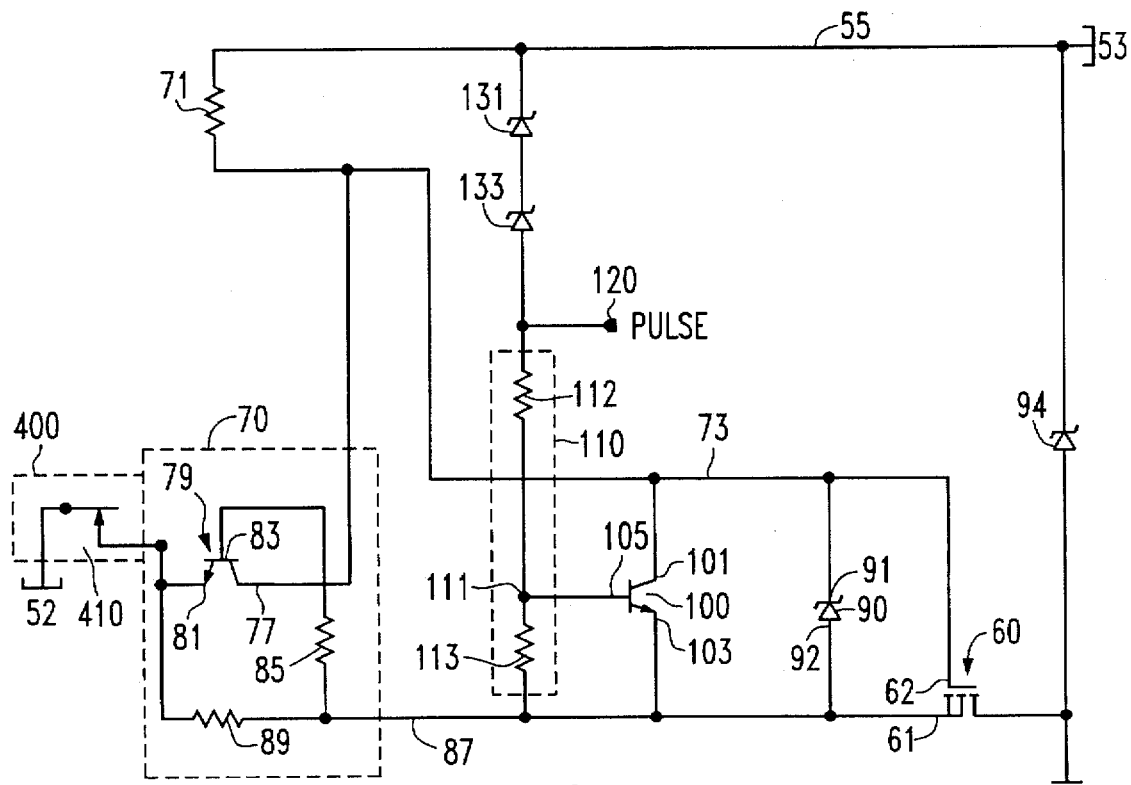
FIG. 3 is a schematic diagram of a third embodiment of a high voltage protection circuit in accordance with the present invention.

FIG. 3 schematically illustrates the configuration of a third embodiment of a high voltage protection circuit in accordance with the present invention, in which the combined integrator and one-shot timing circuit 200 of the embodiment of FIG. 1 are replaced by a thermostat device 400, in the form of a normally closed thermostat 410, which couples the emitter 81 of current limiting transistor 79 to voltage terminal 52 of bridge rectifier 51, in place of a permanent connection as in the embodiments of FIGS. 1 and 2. As in the second embodiment, with the timing circuit removed, line 73, to which line coupling resistor 71 is connected, is coupled directly to the collector 77 of current limiting NPN transistor 79 of the current limiting circuit 70. Also, thermostat 400 may be physcially bonded directly to the body of MOSFET 60 by means of a thermally conductive adhesive.

In operation, as power is dissipated in MOSFET 60 during its on or conductive state, the increase in temperature is sensed by thermostat 400, eventually reaching the trip point of normally closed thermostat 410, opening the switch, and thereby shutting of or interrupting loop current flow directly at the loop current limiting circuit 70, rather than through MOSFET 60. When MOSFET 60 cools down sufficiently (its temperature drops below the trip point of the thermostat), thermocouple switch 410 recloses, reinitiating the operation of current limiting circuit 70, allowing loop current to flow through the MOSFET, and restarting the power dissipation cycle.

As will be appreciated from the foregoing description, the above described problem of damage to or destruction of the electronic circuitry of a craftsperson's test set, due to the accidental application of a potentially destructive high voltage to one or more leads of the test set, is successfully remedied by the overvoltage protection circuit of the present invention. By configuring the test set's dial pulsing circuit to include an N-channel power-dissipating MOSFET as the operative switching component, and incorporating a power-dissipation controlled current-limiting and timing circuit, either as an electronic or thermostat-based implementation, the present invention provides for both normal out-pulse dialing, and power dissipation protection.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A protection circuit for protecting a craftsperson's test set from damage as a result of an electrical path being accidentally provided between test set leads and a high voltage, said test set including a controlled switching device, which has a controlled current path therethrough and is operative, in response to a dial pulse and/or dial tone signal, to controllably draw loop current therethroug hand thereby effect the application of dial pulses and/or dial tone signals to a telephone communication loop to which said test set leads are coupled, said protection circuit comprising:

a current limiting circuit, coupled to said controlled switching device, and being operative to limit the magnitude of current flowing through said controlled switching device; and a current flow control circuit, coupled to said controlled switching device, and being operative to control current flow through said controlled switching device such that the average power dissipated in said controlled switching device does not exceed a predefined limit.

2. A protection circuit according to claim 1, wherein said controlled switching device comprises a power MOSFET device, having a source-drain current flow path coupled to said current limiting circuit, and a gate electrode coupled to receive a control signal from said current flow control circuit, said control signal being operative to control the time during which current is allowed to flow through said controlled switching device, in proportion to the magnitude of the voltage applied to said test leads.

3. A protection circuit according to claim 1, wherein said current flow control circuit is operative to alternately interrupt and permit flow of current through said controlled switching device and to control the duty cycle of alternating interrupting and permitting current flow through said controlled switching device in proportion to the magnitude of the voltage of said test leads, such that the average power dissipated in said controlled switching device as a result of current flow therethrough does not exceed said predefined limit.

4. A protection circuit according to claim 3, wherein said test set includes a dial pulse control circuit and/or dial tone circuit coupled to said controlled switching device, and being operative to alternately interrupt and permit flow of current through said controlled switching device in response to a dial pulse control signal and/or dial tone signal.

5. A protection circuit according to claim 4, wherein said controlled switching device comprises a power MOSFET device, having a source-drain current flow path coupled to said current limiting circuit, and a gate electrode coupled to receive a control signal from said current flow control circuit, said control signal being operative to control the time during which current is allowed to flow through said controlled switching device, in proportion to the magnitude of the voltage applied to said test leads.

6. A protection circuit according to claim 5, wherein said dial pulse control circuit includes a control transistor circuit coupled to the gate and source electrodes of said power MOSFET device, said control transistor being operative, in response to a modulating pulse signal applied thereto, to alternately couple the gate of said MOSFET to its source and to a turn-on voltage.

7. A protection circuit according to claim 1, wherein said test set includes a rectifier coupled to said test set leads, said rectifier having a rectified voltage output terminal to which said protection circuit is coupled, and wherein said current limiting circuit is operative to generate a limited magnitude current in accordance with a voltage derived from said rectified voltage output terminal.

8. A protection circuit according to claim 7, wherein said current limiting circuit comprises a current limiting transistor having an emitter coupled to a rectifier terminal, a base coupled through a base current-limiting resistor to the current flow path of said controlled switching device, a current sense resistor coupled between said current flow path of said controlled switching device and said rectifier terminal, and a collector coupled to said rectified output terminal.

9. A protection circuit according to claim 7, wherein said current flow control circuit is operative to control the time during which current is allowed to flow through said controlled switching device, in proportion to the magnitude of the voltage derived from said rectified output terminal.

10. A protection circuit according to claim 9, wherein said current flow control circuit comprises an integrator and one-shot timing circuit, which are operative to regulate the time during which loop current flows through said controlled switching device, by alternately turning said controlled switching device on and off in proportion to the magnitude of the voltage derived from said rectified output terminal.

11. A protection circuit according to claim 10, wherein said controlled switching device comprises a power MOSFET device, having a source-drain current flow path coupled to said current limiting circuit, and a gate electrode coupled to receive a control signal from said integrator and one-shot timing circuit, said control signal being operative to control the time during which current is allowed to flow through said power MOSFET device, in proportion to the magnitude of the voltage applied to said test leads.

12. A protection circuit according to claim 11, wherein said integrator and one-shot timing circuit are comprised of a first transistor, which is coupled to a time constant control circuit, to a power dissipation recovery duration capacitor, and to a second transistor, said second transistor being coupled to the gate and source electrodes of said power MOSFET device, said first transistor being operative to control the operation of said second transistor, such that the gate of said MOSFET is coupled to receive a turn-on voltage for a duration defined by said time constant control circuit, and wherein said second transistor is operative to couple the gate of said MOSFET to its source for a period of time defined by said power dissipation recovery duration capacitors.

13. A protection circuit, for protecting a craftsperson's test set from damage as a result of an electrical path being accidentally provided between test set leads and a high voltage, said test set including a controlled switching device, which has a controlled current path therethrough and is operative, in response to a dial pulse and/or dial tone signal, to controllably draw loop current therethrough and thereby effect the application of dial pulses and/or dial tone signals to a telephone communication loop to which said test set leads are coupled, said protection circuit comprising:

a current limiting circuit, coupled to said controlled switching device, and being operative to limit the magnitude of current flowing through said controlled switching device; and a current flow control circuit, coupled to said controlled switching device, and being operative to control the time during which current is allowed to flow through said controlled switching device, in dependence upon the voltage applied to said test leads, and wherein said current flow control circuit comprises a thermostat device, which is coupled to control the time during which current is allowed to flow through said controlled switching device, in dependence upon heating of said controlled switching device as a result of dissipation of power in said controlled switching device during current flow therethrough.

14. A protection circuit according to claim 13, wherein said thermostat device comprises a temperature sensitive switch device, which is coupled to said controlled switching device, and is normally open to allow current to flow through said controlled switching device, and is closed to terminate current flow through said controlled switching device, in dependence upon heating of said controlled switching device as a result of dissipation of power in said controlled switching device during current flow therethrough.

15. A protection circuit according to claim 13, wherein said thermostat device comprises a temperature sensitive switch device, which is coupled to said current limiting circuit, and is normally closed to enable said current limiting circuit to supply current to said controlled switching device, and is opened to disable said current limiting circuit from supplying current to said controlled switching device, in dependence upon heating of said controlled switching device as a result of dissipation of power in said controlled switching device during current flow therethrough.

16. A protection circuit for protecting a craftsperson's test set from damage as a result of an electrical path being accidentally provided between test set leads and a high voltage, said test set including a controlled switching device, which has a controlled current path therethrough and is operative, in response to a dial pulse control signal and/or dial tone signal, to controllably draw loop current therethrough and thereby effect the application of dial pulses and/or dial tone signals to a telephone communication loop to which said test set leads are coupled, said protection circuit comprising:

a power-dissipating MOSFET employed as said controlled switching device; and a current-limiting and timing circuit, which is operative, during dialing mode, to alternately turn said power-dissipating MOSFET on and off in accordance with a dial pulse signal applied thereto and, during an over-voltage protection mode, to regulate current flow through said power-dissipating MOSFET, by alternately turning said power-dissipating MOSFET on and off, in a manner that limits power dissipation in the power-dissipating MOSFET to less than a destructive value, in accordance with the product of its source-drain loop current and its drain-source voltage derived from a voltage on said test set leads.

17. A protection circuit according to claim 16, wherein said current flow control circuit comprises a thermostat device, which is coupled to control the time during which current is allowed to flow through said power-dissipating MOSFET, in dependence upon heating of said power-dissipating MOSFET as a result of dissipation of power in said power-dissipating MOSFET, during current flow therethrough.

18. A protection circuit according to claim 17, wherein said thermostat device comprises a temperature sensitive switch device, which is coupled to said power-dissipating MOSFET, and is normally open to allow current to flow through said power-dissipating MOSFET, and is closed to terminate current flow through said power-dissipating MOSFET, in dependence upon heating of said power-dissipating MOSFET, as a result of dissipation of power in said power-dissipating MOSFET during current flow therethrough.

19. A protection circuit according to claim 17, wherein said thermostat device comprises a temperature sensitive switch device, which is coupled to said current limiting circuit, and is normally closed to enable said current limiting circuit to supply current to said power-dissipating MOSFET, and is opened to disable said current limiting circuit from supplying current to said power-dissipating MOSFET, in dependence upon heating of said power-dissipating MOSFET, as a result of dissipation of power in said power-dissipating MOSFET during current flow therethrough.

20. A protection circuit according to claim 16, wherein said test set includes a rectifier coupled to said test set leads, said rectifier having a rectified voltage output terminal to which said protection circuit is coupled, and wherein said current-limiting and timing circuit is operative to generate a limited magnitude current in accordance with a voltage derived from said rectified voltage output terminal.

21. A protection circuit according to claim 20, wherein said current-limiting and timing circuit comprises a dial pulse control circuit coupled to the gate and source electrodes of said power-dissipating MOSFET, and being operative, in response to a dial pulse modulating pulse signal applied thereto, to alternately couple the gate of said power-dissipating MOSFET to its source and to a MOSFET turn-on voltage.

22. A protection circuit according to claim 20, wherein said current-limiting and timing circuit is operative to control the time during which current is allowed to flow through said power-dissipating MOSFET, in dependence upon the voltage derived from said rectified output terminal.

23. A protection circuit according to claim 22, wherein said current-limiting and timing circuit includes a first transistor, which is coupled to a time constant control circuit, to a power dissipation recovery duration capacitor, and to a second transistor, said second transistor being coupled to the gate and source electrodes of said power-dissipating MOSFET, said first transistor being operative to control the operation of said second transistor, such that the gate of said power-dissipating MOSFET is coupled to receive a turn-on voltage for a duration defined by said time constant control circuit, and wherein said second transistor is operative to couple the gate of said power-dissipating MOSFET to its source for a period of time defined by said power dissipation recovery duration capacitors.

24. A method of protecting a craftsperson's test set from damage as a result of an electrical path being accidentally provided between test set leads and a high voltage, said test set including a controlled switching device, which has a controlled current path therethrough and is operative, in response to a dial pulse control signal and/or dial tone signal, to controllably draw loop current therethrough and thereby effect the application of dial pulses and/or dial tone signals to a telephone communication loop to which said test set leads are coupled, said method comprising the steps of:

(a) limiting the magnitude of current flowing through said controlled switching device during the time that a loop current flow is provided through said controlled switching device; and (b) controlling the time during which current is allowed to flow through said controlled switching device, so as to control current flow through said controlled switching device such that the average power dissipated in said controlled switching device does not exceed a predefined limit.

25. A method according to claim 24, wherein step (b) comprises alternately interrupting and permitting flow of current through said controlled switching device and controlling the duty cycle of alternately interrupting and permitting current flow through said controlled switching device in proportion to the magnitude of the voltage of said test leads, such that the average power dissipated in said controlled switching device, as a result of current flow therethrough, does not exceed said predefined limit.

26. A method according to claim 24, wherein said step (b) comprises coupling a thermostat device to said controlled switching device, so that said thermostat controls the time during which current is allowed to flow through said controlled switching device, in dependence upon heating of said controlled switching device as a result of dissipation of power in said controlled switching device during current flow therethrough.

27. A method according to claim 24, wherein said controlled switching device comprises a power MOSFET device, having a source-drain current flow path through which said loop current, as limited in step (a) flows, and a gate electrode to which a control signal, for controlling the time during which current is allowed to flow in step (b), is applied in proportion to the magnitude of the voltage applied to said test leads.

28. A method according to claim 27, wherein said test set includes a dial pulse control circuit coupled to said power MOSFET device, and further including the step of:

(c) operating said dial pulse control circuit in accordance with a dial pulse control signal, so as to alternately interrupt and permit flow of current through said power MOSFET, so as to effect the generation of dialing pulses.

29. A method according to claim 27, wherein said dial pulse control circuit includes a control transistor circuit which is coupled to the gate and source electrodes of said power MOSFET device, and is operative, in response to a modulating pulse signal applied thereto, to alternately couple the gate of said power MOSFET to its source and to a turn-on voltage.

30. A method according to claim 27, wherein step (b) comprises coupling a first transistor to a time constant control circuit, to a power dissipation recovery duration capacitor, and to a second transistor, said second transistor being coupled to the gate and source electrodes of said power MOSFET, controlling the operation of said first transistor such that said transistor controls the operation of said second transistor, so that the gate of said power MOSFET receives a turn-on voltage for a duration defined by said time constant control circuit, and wherein said second transistor couples the gate of said MOSFET to its source for a period of time defined by said power dissipation recovery duration capacitor.

31. A method of protecting a craftsperson's test set from damage as a result of an electrical path being accidentally provided between test set leads and a high voltage, said test set including a controlled switching device, which has a controlled current path therethrough and is operative, in response to a dial pulse control signal and/or dial tone signal, to controllably draw loop current therethrough and thereby effect the application of dial pulses and/or dial tone signals to a telephone communication loop to Which said test set leads are coupled, said method comprising the steps of:

(a) for a dialing mode, alternately turning said controlled switching device on and off in accordance with a dial pulse signal applied thereto; and (b) for an overvoltage protection mode, regulating current flow through said controlled switching device by alternately turning said controlled switching device on and off, in a manner that limits average power dissipation in said controlled switching device to less than a destructive value during the time that current is flowing through said controlled switching device.

32. A method according to claim 31, wherein step (b) comprises regulating the magnitude of current flow and the time that current flows through said controlled switching device by alternately turning said controlled switching device on and off, so as to limit average power dissipation in said controlled switching device to less than a destructive value.

33. A method according to claim 32, wherein said controlled switching device comprises a power MOSFET, having its gate-source voltage established in accordance with a voltage to which said test leads are coupled, and its drain-source current regulated in step (b).

34. A method according to claim 31, wherein said step (b) comprises coupling a thermostat device to said controlled switching device, so that said thermostat controls the time during which current is allowed to flow through said controlled switching device, in dependence upon heating of said controlled switching device as a result of dissipation of power in said controlled switching device during current flow therethrough.

* * * * *